(12) United States Patent
Webster et al.

(10) Patent No.: US 6,220,602 B1
(45) Date of Patent: Apr. 24, 2001

(54) SEAL ARRANGEMENT

(75) Inventors: John R Webster, Derby; David S Knott, Loughborough, both of (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/289,542

(22) Filed: Apr. 12, 1999

(30) Foreign Application Priority Data

Apr. 17, 1998 (GB) .................................................. 9808139

(51) Int. Cl.$^7$ ...................................................... F16J 15/43
(52) U.S. Cl. ............................................ 277/410; 277/378
(58) Field of Search ...................................... 277/410, 378

(56) References Cited

U.S. PATENT DOCUMENTS

| | | |
|---|---|---|
| 2,883,212 | * 4/1959 | Laser . |
| 3,869,135 | 3/1975 | Diederich . |
| 4,434,987 | * 3/1984 | Albers et al. . |
| 4,447,063 | * 5/1984 | Kotzur et al. . |
| 4,600,202 | * 7/1986 | Schaeffler et al. . |
| 4,795,168 | * 1/1989 | Adams et al. . |
| 5,064,205 | * 11/1991 | Whitford . |
| 5,161,804 | * 11/1992 | Orlowski et al. . |
| 5,865,441 | * 2/1999 | Orlowski . |

FOREIGN PATENT DOCUMENTS

| | | |
|---|---|---|
| 0458547 A2 | 11/1981 | (EP) . |
| 2087986 | 6/1982 | (GB) . |
| 2258699 | 2/1993 | (GB) . |
| WO23298 | 8/1995 | (WO) . |

* cited by examiner

*Primary Examiner*—Terry Lee Melius
*Assistant Examiner*—James M. Hewitt
(74) *Attorney, Agent, or Firm*—W. Warren Taltavull; Manelli, Denison & Selte PLLC

(57) ABSTRACT

A seal arrangement (40) between relatively movable components (42,48) includes at least one magnet (54) on a first component (48) and at least one magnet (56) on the second component (42). A clearance (55) is defined between the at least one magnet (54) on the first component (48) and the at least one magnet (56) on the second component (42). Springs (58) bias the at least one magnet (54) on the first component (48) and the at least one magnet (56) on the second component (42) towards each other. The at least one magnet (54) on the first component (42) and the at least one magnet (56) on the second component (42) are arranged to repel each other against the spring (58) to control the clearance (55).

37 Claims, 2 Drawing Sheets

SEAL ARRANGEMENT

THE FIELD OF THE INVENTION

The present invention relates to a seal arrangement and in particular to a seal arrangement between relatively movable components.

BACKGROUND OF THE INVENTION

It is frequently necessary to effect a seal in a clearance gap between two components that are capable of relative movement. In particular one or more seals are often required to seal between a rotatable shaft and a static component containing the shaft, the static structure having a bore through which the shaft extends. A gas turbine engine has shafts which rotate at relatively high speeds and which are exposed to pressurised hot gases. Seals are required between the shafts and a surrounding static structure. Also a gas turbine engine has rotor discs, or drums, which rotate at relatively high speeds and which carry the rotor blades. Seals are required between the radial tips of the rotor blades and a surrounding static structure and seals are required between the rotor disc, or drum, and the static structure. The seal performance may have a significant effect on the overall efficiency of the gas turbine engine.

In gas turbine engines it is known to control the clearance between the rotor blade tips and the static structure by using materials with different coefficients of thermal expansion, by controlled heating or cooling the static structure surrounding the rotor blades, by the controlled supply of pressurised gas to a chamber to move the static structure or by using abradable seals.

In gas turbine engines it is known to use seals between the rotor disc, or drum, and the static structure for example labyrinth seals, abradable seals etc.

In gas turbine engines it is known to use seals between the shaft and the static structure for example labyrinth seals, brush seals, leaf seals and air riding seals etc.

Labyrinth seals, abradable seals, leaf seals and brush seals are passive seals whereas the controlled heating and the controlled pressurising of the static structure are active seals.

In most gas turbine engines labyrinth seals are used and these are designed to avoid large clearances at certain operating conditions, however their sealing is not as good as required and hence the specific fuel consumption is not good. The active seals have the potential to give increased sealing with a resultant improvement in the specific fuel consumption of the gas turbine engine but they are not generally used because they are complex systems.

Any improvement in the seals may improve the specific fuel consumption of the gas turbine engine.

SUMMARY OF THE INVENTION

The present invention seeks to provide a novel seal arrangement which has improved sealing efficiency.

Accordingly the present invention provides a seal arrangement between relatively movable components, the seal comprising at least one magnet on a first one of the components and at least one magnet or at least one electrically conducting member on the second component, a clearance being defined between the first component and the second component, means to bias the at least one magnet on the first component and the at least one magnet or electrically conducting member on the second component towards each other to reduce the clearance, and the at least one magnet on the first component and the at least one magnet or electrically conducting member on the second component being arranged to produce a force to act against the biasing means to control the clearance.

The first and second components may be relatively rotatable. The first component may be a static component and the second component may be a rotatable component.

The first component may comprise a stator casing and a plurality of stator vanes extending radially inwardly from the stator casing, the second component comprises a rotor carrying a plurality of rotor blades, a plurality of circumferentially arranged magnets on the radially inner ends of the stator vanes, at least one magnet or at least one electrically conducting member on the rotor and means to bias the stator vanes radially inwardly towards the rotor.

The rotor may have at least one annular magnet or at least one set of circumferentially arranged magnets. The rotor may have at least one annular electrically conducting member.

The first component may comprise a stator structure, the second component comprises a rotor carrying a plurality of rotor blades, at least one magnet on the stator structure, at least one magnet or at least one electrically conducting member on the rotor and means to bias the at least one magnet on the stator axially towards the rotor.

The stator structure may have at least one annular magnet.

The first component may a rotatable component and the second component may be a static component.

The first component may be a rotor carrying a plurality of rotor blades, the second component is a stator casing, each rotor blade having a magnet at its tip, the casing having a portion surrounding the blade tips, the casing portion is biased radially towards the blade tips, the casing portion comprising at least one electrically conducting member or a plurality of magnets.

The rotor may be a compressor rotor, a turbine rotor or a fan rotor.

The static component may carry a plurality of radially inwardly extending and tangentially inclined magnetic members, the rotatable component has at least one magnet or at least one electrically conducting member spaced radially from the radially inner ends of the magnetic members.

The radially inwardly extending and tangentially inclined magnetic members may be bristles or leaves.

The means to bias may comprise a supply of pressurised fluid or it may comprise spring means.

The at least one magnet on the first component may be a permanent magnet, an electromagnet or a superconducting magnet. The at least one magnet on the second component may be a permanent magnet, an electromagnet or a superconducting magnet.

There may be means to measure the clearance and means to adjust the biasing means in response to the clearance measurement to control the clearance.

The clearance may be defined between the at least one magnet on the first component and the at least one magnet or the electrically conducting member on the second component.

The clearance may be defined between a sub component attached to the at least one magnet on the first component and a sub component attached to the at least one magnet or the electrically conducting member on the second component.

BRIEF DESCRIPTION OF THE DRAWINGS

The present invention will now be described by way of example with reference to the accompanying drawings, in which.

DETAILED DESCRIPTION OF THE INVENTION

Figure 1:
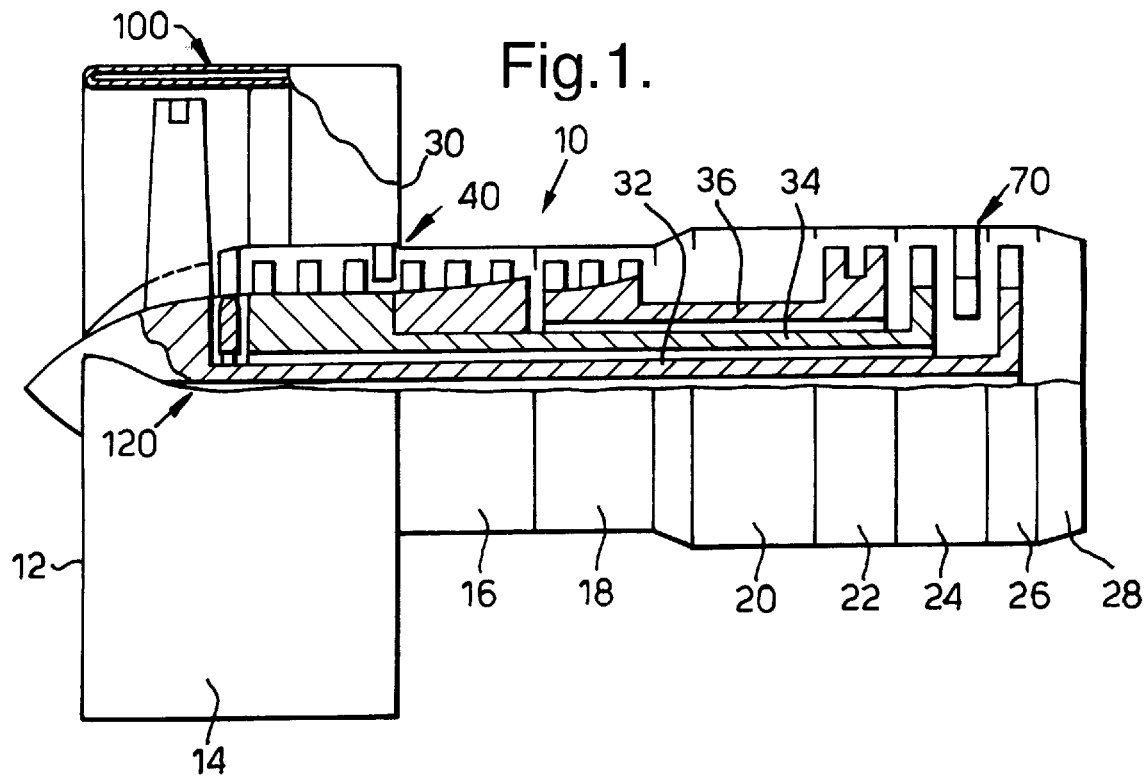
FIG. 1 is a partially cut-away view of a turbofan gas turbine engine having one or more seals according to the present invention.

A turbofan gas turbine engine 10 is shown in FIG. 1 and comprises in axial flow series an intake 12, a fan section 14, an intermediate pressure compressor section 16, a high pressure compressor section 18, a combustion section 20, a high pressure turbine section 22, an intermediate pressure turbine section 24, a low pressure turbine section 26 and an outlet 28. The fan section 14 has a fan outlet 30. The low pressure turbine section 26 is arranged to drive the fan section 14 by a first shaft 32, the intermediate pressure turbine section 24 is arranged to drive the intermediate pressure compressor section 16 by a shaft 34 and the high pressure turbine section 26 is arranged to drive the high pressure compressor section 18 by a shaft 36.

The turbofan gas turbine engine 10 operates conventionally in that air is compressed as it flows through the fan section 14, the intermediate pressure compressor section 16 and the high pressure compressor section 18. The air is delivered into the combustion chamber 20 and fuel is injected into the combustion chamber 20 and is burnt in the air to produce hot gases. The hot gases flow through and drive the high pressure turbine section 22, the intermediate pressure turbine section 24 and the low pressure turbine section 26. The hot gases then flow through the outlet 28 to provide some thrust. However, the main thrust is provided by the air compressed by the fan section 14 and discharged through the fan outlet 30.

The specific fuel consumption of a gas turbine engine may be increased if the seals used in the gas turbine engine have improved efficiency.

Several novel seal arrangements according to the present invention are shown in FIG. 1, and in more detail in FIGS. 2 to 6.

Figure 2:
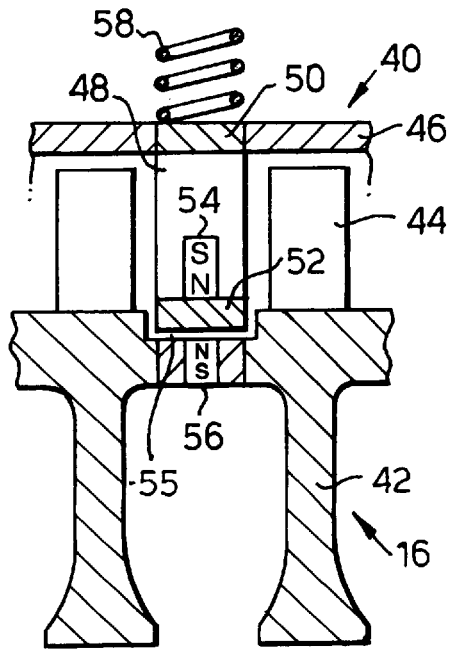
FIG. 2 is a sectional view through a first embodiment of a seal according to the present invention.

The seal arrangement 40 in FIG. 2 is located in the intermediate pressure compressor section 16 of the turbofan gas turbine engine 10, however it may be located in the high pressure compressor sections 18, the high pressure turbine section 22, the intermediate pressure turbine section 24 or the low pressure turbine section 26.

A compressor rotor 42 carries a plurality of circumferentially spaced and radially outwardly extending compressor rotor blades 44. The rotor 42 and rotor blades 44 are surrounded by a compressor casing 46. The compressor casing 46 carries a plurality of circumferentially spaced and radially inwardly extending stator vanes 48. The stator vanes 48 are generally located between adjacent stages of rotor blades 44. The stator vanes 48 have shrouds 50 at their radially outer ends and shrouds 52 at their radially inner ends.

The seal arrangement 40 comprises a magnet 54 located in the shroud 52 of each stator vane 48 and at least one magnet 56 located in the rotor 42. The magnets 54 and the at least one magnet 56 are located in a plane arranged perpendicular to the axis of rotation of the rotor 42. The magnets 54 are arranged such that their north poles are at their radially inner ends. The at least one magnet 56 is arranged such that its/their north pole(s) are at its/their radially outer ends. Therefore the magnets 54 and 56 are arranged to repel each other. Preferably a single annular magnet 56 is used but a plurality of discrete circumferentially spaced magnets may be used. A clearance, or seal, 55 is formed between the radially inner ends of the shrouds 52 and the rotor 42.

The stator vanes 48 and shrouds 50 are mounted on the casing 46 such they are radially movable with respect to the casing 46 and the rotor 42. The stator vanes 48 are provided with springs 58 to bias the stator vanes 48 radially inwardly towards the rotor 42.

In operation the springs 58 push the stator vanes 48 radially inwardly towards the rotor 42 to minimize the clearance 55 between the rotor 42 and the stator vanes 48. The repulsive force between the magnets 54 and 56 pushes the stator vanes 48 radially outwardly away from the rotor 42 to increase the clearance 55 between the rotor 42 and the stator vanes 48. The closing force of the spring 58 and the opening force of the magnets 54 and 56 balance at some position to maintain a constant clearance 55 for a given operating condition. The arrangement also allows for differences in thermal expansion between the casing 46 and the rotor 42 and rotor blades 44, centrifugal growth of the rotor 46 and rotor blades 44. Rapid changes in clearance 55 may also be accommodated by using stronger magnetic fields and spring forces and possibly the use of damping. The magnetic repulsive force increases with a decrease in the gap, the clearance 55, between the magnets 54 and 56.

Alternatively it is possible to arrange the south poles on the magnets 54 to face the south poles on the magnets 56.

Figure 3:
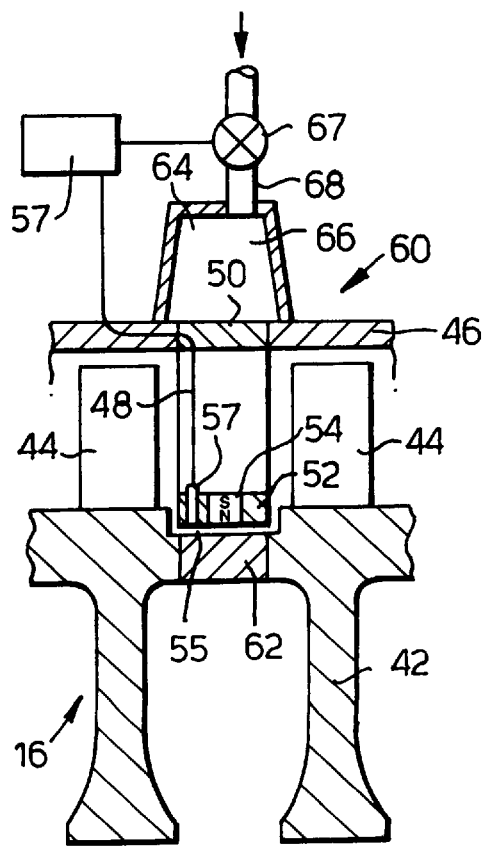
FIG. 3 is a sectional view through a second embodiment of a seal according to the present invention.

The seal arrangement 60 in FIG. 3 is located in the intermediate pressure compressor section 16 of the turbofan gas turbine engine 10, however it may be located in the high pressure compressor sections 18, the high pressure turbine section 22, the intermediate pressure turbine section 24 or the low pressure turbine section 26.

A compressor rotor 42 carries a plurality of circumferentially spaced and radially outwardly extending compressor rotor blades 44. The rotor 42 and rotor blades 44 are surrounded by a compressor casing 46. The compressor casing 46 carries a plurality of circumferentially spaced and radially inwardly extending stator vanes 48. The stator vanes 48 are generally located between adjacent stages of rotor blades 44. The stator vanes 48 have shrouds 50 at their radially outer ends and shrouds 52 at their radially inner ends.

The seal arrangement 60 comprises a magnet 54 located in the shroud 52 of each stator vane 48 and an electrically conducting annular member 62 located in the rotor 42. The magnets 54 and the electrically conducting annular member 62 are located in a plane arranged perpendicular to the axis of rotation of the rotor 42. The magnets 54 are arranged such that their north poles are at their radially inner ends. A clearance, or seal, 55 is formed between the radially inner ends of the shrouds 52 and the rotor 42.

The stator vanes 48 and shrouds 50 are mounted on the casing 46 such they are radially movable with respect to the casing 46 and the rotor 42. The stator vanes 48 are provided with means to bias the stator vanes 48 radially inwardly towards the rotor 42. The means to bias the stator vanes 48 comprises an annular wall 64 which is secured at its upstream and downstream ends to the casing 46 to define a chamber 66. A pipe 68 is arranged to supply or remove pressurising fluid from the chamber 66 so as to use the pressure of the fluid to bias the stator vanes 48 radially inwardly.

In operation the fluid pressure in the chamber 66 pushes the stator vanes 48 radially inwardly towards the rotor 42 to minimise the clearance 55 between the rotor 42 and the stator vanes 48. The movement of the magnets 54 relative to the electrically conducting annular member 62 induces eddy currents in the electrically conducting member 62. The eddy currents react with the magnetic field to produce a repulsive force between the magnets 54 and 56 which pushes the stator vanes rotor 48 radially outwardly away from the rotor 42 to increase the clearance 55 between the rotor 42 and the stator vanes 48. The closing force of the fluid pressure in the chamber 66 and the opening force of the magnets 54 and the electrically conducting member 62 balance at some position to maintain a constant clearance 55 for a given operating condition. The arrangement also allows for differences in thermal expansion between the casing 46 and the rotor 42 and rotor blades 44, centrifugal growth of the rotor 46 and rotor blades 44. Rapid changes in clearance 55 may also be accommodated by using stronger magnetic fields and fluid pressure forces and possibly the use of damping. The repulsive force increases with a decrease in the gap, the clearance 55, between the magnets 54 and the electrically conducting member 62.

It is possible to arrange all the south, or all the north, poles on the magnets 54 to face the electrically conducting member 62.

It is possible to use the springs of FIG. 2 in the seal of FIG. 3 or the fluid pressure in FIG. 3 in the seal of FIG. 2.

Figure 4:
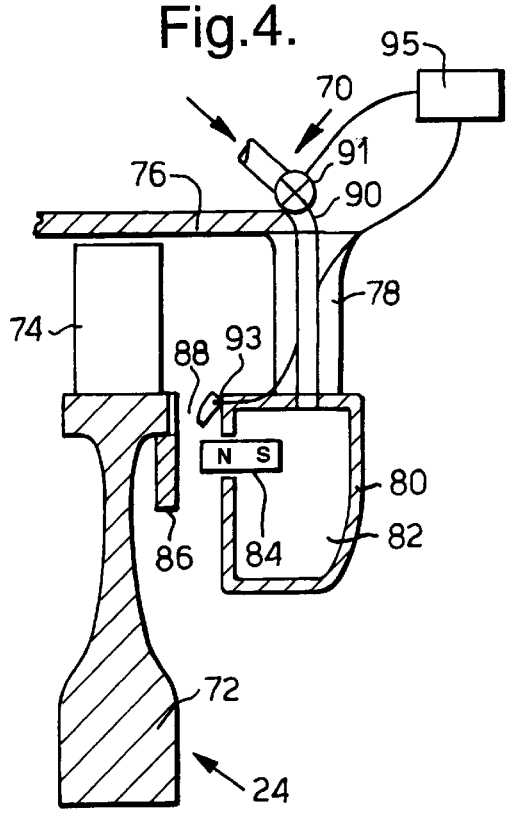
FIG. 4 is a sectional view through a third embodiment of a seal according to the present invention.

The seal arrangement 70 in FIG. 4 is located in the intermediate pressure turbine section 24 of the turbofan gas turbine engine 10, however it may be located in the intermediate pressure compressor section 16, the high pressure compressor sections 18, the high pressure turbine section 22 or the low pressure turbine section 26.

A turbine rotor 72 carries a plurality of circumferentially spaced and radially outwardly extending compressor rotor blades 74. The rotor 72 and rotor blades 74 are surrounded by a turbine casing 76. The turbine casing 76 carries a plurality of circumferentially spaced and radially inwardly extending stator vanes 78. The stator vanes 78 are generally located between adjacent stages of rotor blades 74. The stator vanes 78 are secured to the turbine casing 76 at their radially outer ends and are secured to a stator structure 80 at their radially inner ends. The stator structure 80 defines an annular chamber 82.

The seal arrangement 70 comprises at least one magnet 84 located in the stator structure 80 and the at least one magnet 84 is arranged to move axially relative to the stator structure 80 and the rotor 72. At least one magnet 86 is arranged on the rotor 72 and the at least one magnet 84 and the at least one magnet 86 are located at the same radial distance from the axis of rotation of the rotor 72. The at least one magnet 84 is arranged such that its/their north pole(s) are at its/their axially upstream ends. The at least one magnet 86 is arranged such that its/their north pole(s) are at its/their axially downstream ends. Therefore the magnets 84 and 86 are arranged to repel each other. Preferably a single annular magnet 86 and a single annular magnet 84 are used but a plurality of discrete circumferentially spaced magnets 84 and 86 or one annular magnet 84 or 86 and a plurality of magnets 86 or 84 respectively may be used. A clearance, or seal, 88 is formed between the axially upstream ends of the magnets 84 and the axially downstream ends of the magnets 86.

The at least on magnet 84 is mounted on the stator structure 80 such they are axially movable with respect to the stator structure 80 and the rotor 72. The chamber 82 of the stator structure 80 is supplied with pressuring fluid to bias the at least one magnet 84 axially upstream towards the rotor 72.

In operation the fluid pressure in the chamber 82 pushes the at least one magnet 84 axially upstream towards the rotor 72 to minimize the clearance 88 between the rotor 72 and the stator structure 80. The repulsive force between the magnets 84 and 86 pushes the magnets 84 axially downstream away from the rotor 72 to increase the clearance 88 between the rotor 72 and the stator structure 80. The closing force of the fluid pressure in the chamber 82 and the opening force of the magnets 84 and 86 balance at some position to maintain a constant clearance 88 for a given operating condition. The arrangement also allows for differences in thermal expansion between the casing 76 and the rotor 72 and rotor blades 74, centrifugal growth of the rotor 76 and rotor blades 74. Rapid changes in clearance 88 may also be accommodated by using stronger magnetic fields and spring forces and possibly the use of damping. The magnetic repulsive force increases with a decrease in the gap, the clearance 88, between the magnets 84 and 86.

Alternatively it is possible to arrange the south poles on the magnets 84 to face the south poles on the magnets 86.

Alternatively it is possible to use an electrically conducting annular member in place of the magnet 86 and to use eddy currents generated in the electrically conducting member to repel the magnet 84.

It is also possible to use springs in place of the fluid pressure in the chamber 82 to bias the magnet 84 towards the rotor 72.

The pressurised fluid may be air supplied from a preselected point in the compressor sections of the turbofan gas turbine engine.

Figure 5:
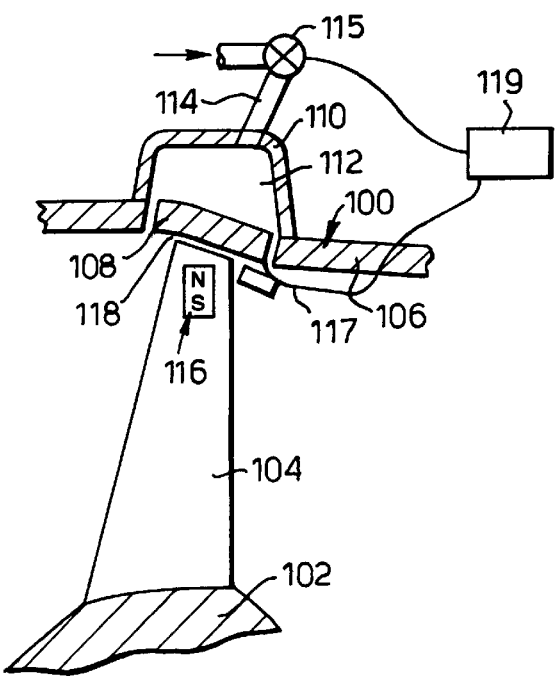
FIG. 5 is a sectional view through a fourth embodiment of a seal according to the present invention.

The seal arrangement 100 in FIG. 5 is located in the fan section 14 of the turbofan gas turbine engine 10, however it may be located in the intermediate pressure compressor section 16, the high pressure compressor section 18, the high pressure turbine section 22, the intermediate pressure turbine section 24 or the low pressure turbine section 26.

A compressor rotor 102 carries a plurality of circumferentially spaced and radially outwardly extending fan rotor blades 104. The rotor 102 and rotor blades 104 are surrounded by a fan casing 106. A shroud 108 is carried by the fan casing 106 and the shroud 108 is movable radially with respect to the casing 106 and the fan blades 104.

The seal arrangement 100 comprises a magnet 116 located in the tip of each fan blade 104 and the shroud 108 either comprises a plurality of segments each of which has one magnet or the shroud comprises a resilient electrically conducting annular member. The magnets 116 and the magnets or electrically conducting annular member are located in a plane arranged perpendicular to the axis of rotation of the rotor 102. The magnets 116 are arranged such that their north poles are at their radially inner ends. The magnets in the fan blades 104 are arranged such that their north poles are at their radially outer ends. Therefore the magnets 116 and the magnets in the fan blades are arranged to repel each other or the eddy currents in the electrically conducting member repel the magnets 116. A clearance, or seal, 118 is formed between the radially outer ends of the fan blades 104 and the shroud 108.

The shroud 108 is mounted on the fan casing 106 such that it is radially movable with respect to the fan casing 106 and the rotor 102. An annular member 110 is secured at its upstream and downstream ends to the fan casing 106 to define an annular chamber 112 with the shroud 108. A pipe 114 is arranged to supply or remove pressurised fluid from the chamber 112 to bias the shroud 108 radially inwardly towards the rotor 102.

In operation the fluid pressure in the chamber 112 pushes the shroud 108 radially inwardly towards the fan blades 104 to minimise the clearance 118 between the fan blades 104 and the shroud 108. The repulsive force between the magnets 116 and the magnets or electrically conducting member of the shroud 108 pushes the shroud 108 radially outwardly away from the fan blades 104 to increase the clearance 118 between the fan blades 104 and the shroud 108. The closing force of the fluid pressure and the opening force of the magnets 116 and magnets or electrically conducting member on the shroud 108 balance at some position to maintain a constant clearance 118 for a given operating condition. The arrangement also allows for differences in thermal expansion between the casing 106 and the rotor 102 and fan blades 104, centrifugal growth of the rotor 102 and fan blades 104. Rapid changes in clearance 118 may also be accommodated by using stronger magnetic fields and biasing forces and possibly the use of damping. The magnetic repulsive force increases with a decrease in the gap, the clearance 118, between the magnets 116 and the magnets or electrically conducting member on the shroud 108.

Alternatively it is possible to arrange the south poles on the magnets 116 to face the south poles on the magnets on the shroud 108. One or more springs may be used to bias the shroud 108 towards the fan blades 104 rather than pressurising fluid.

It is preferred that electromagnets are used in the fan blades, which are energised by external supply and these are synchronised with electromagnets in the shroud.

Figure 6:
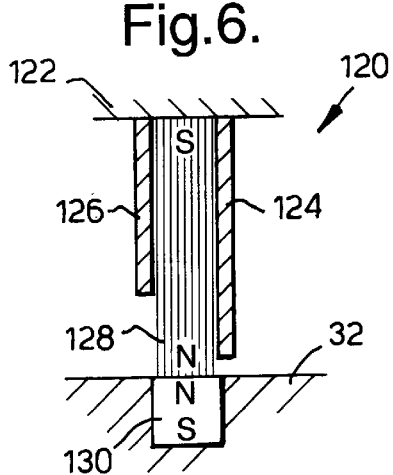
FIG. 6 is a sectional view through a fifth embodiment of a seal according to the present invention.

The seal arrangement 120 in FIG. 6 is arranged on the shaft 32. The seal 120 comprises a stator structure 122 surrounding the shaft 32 and a brush, or leaf, seal arrangement comprising a pair of radially extending supporting plates 124 and 126 and a plurality of bristles, or leaves, 128 arranged between the supporting plates 124 and 126. The bristles, or leaves, 128 are arranged to extend circumferentially and radially and such that the radially inner ends of the bristles, or leaves, 128 contact the surface of the shaft 32. The bristles, or leaves, 128 are magnetic. The shaft is provided with at least one magnet or an electrically conducting annular member 130. The bristles, or leaves, 128 and the at least one magnet or electrically conducting annular member 130 are arranged in a plane perpendicular to the engine axis. The elasticity of the bristles, or leaves, 128 provides the biasing of the bristles, or leaves, 128 towards the shaft 32 but other means may be provided.

In operation the repulsive force between the bristles, or leaves, 128 and the magnet or electrically conducting member 130 pushes the bristles, or leaves, 128 away from the shaft 32 to form a clearance to reduce wear of the bristles, or leaves, 128 and the shaft 32.

It may be possible to arrange the bristles to extend axially and circumferentially to seal against an axial face of a rotor or shaft rather than against a radial face of the shaft or rotor.

This would allow the use of springs or pressurising fluid to move the bristle, leaf, seal axially against the shaft or rotor.

The magnets may be permanent magnets or electromagnets or superconducting magnets. If electromagnets are used this has the advantage of allowing the magnetic force to be turned off to allow magnetic debris, which has accumulated around the magnets, to be removed from the seal. The magnetic debris may be removed using air bled from the compressor of the gas turbine engine.

The use of two magnets to provide the repulsive force enables a repulsive force to be generated from rest. This alleviates the need to remove the biasing force minimising the seal clearance at some operating conditions to minimise wear of the components. This may be advantageous for ground, ship or other industrial gas turbines or steam turbines. However, permanent magnets may increase the weight of aero gas turbine engines. The use of electrically conducting members to produce eddy currents to provide the repulsive force potentially removes the need for permanent magnets from the rotor of the gas turbine engine significantly reducing the weight of the gas turbine engine.

Figure 7:
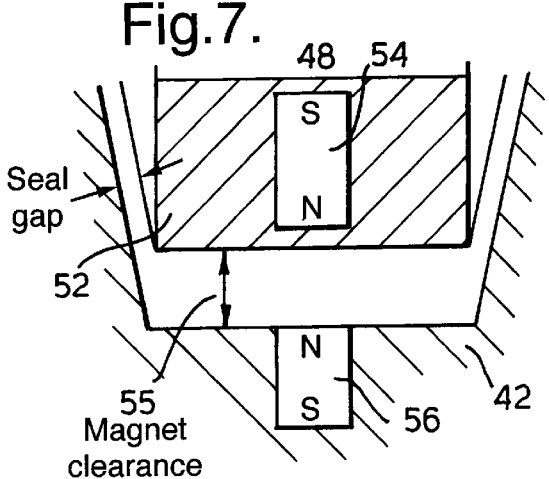
FIGS. 7 and 8 are views respectively of the use of angled seals and increased magnet overlap.
Figure 8:
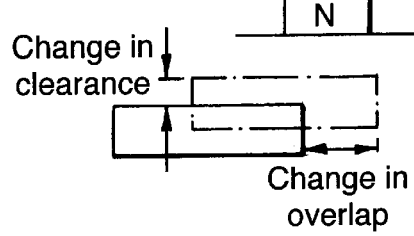

Improved clearance control may be provided by making small clearance changes lead to large changes in gap between the magnets. This is possible by using angled seals as in FIG. 7 which is an enlarged view of part of FIG. 2 or increased magnet overlap with reduced seal clearance as in FIG. 8.

The examples in FIGS. 2 to 8 use simple single pole magnets. However it may be possible to use multiple pole magnets, double sided magnets and segmented magnets to improve the stiffness, drag etc.

The examples in FIGS. 2 to 8 have only one annular magnet, or one set of circumferentially arranged magnets, on the rotor and annular magnet or one set of circumferentially arranged magnets on the stator. However, it may be possible to provide two or more annular magnets or two or more sets of circumferentially arranged magnets, on the rotor with a corresponding number of annular magnets, or sets of circumferentially arranged magnets. Also the magnets on one of the rotor or stator may be replaced by electrically conducting members. These additional magnets will be arranged axially, or radially, in series with the first magnets to improve sealing.

A sensor may be provided to measure the clearance between the rotor and the stator in the seal and a signal may be supplied to a control system which supplies further signals to adjust the clearance. For example in FIGS. 3, 4 and 5 the sensor 57, 93, 117 may provide a measurement of the clearance to controller 59, 95, 117 which sends a signal to the valves 67, 91, 115 in the pipes 66, 90, 114 respectively to control the amount of fluid supplied into or removed from the annular chambers 64, 82, 112 to adjust the clearance.

The seal may also be used together with conventional seals, for example air riding seals, labyrinth seals etc.

We claim:

1. A seal arrangement between relatively movable first and second components, the seal comprising at least one magnet on the first component and at least one electrically conducting member on the second component, the at least one magnet producing a magnetic field, a clearance being defined between the first component and the second component, means to bias the at least one magnet on the first component and the at least one electrically conducting member on the second component towards each other to reduce the clearance, and the at least one magnet on the first component and the at least one electrically conducting member on the second component being arranged to induce eddy currents in the electrically conducting member which react with the magnetic field to produce a force to act against the biasing means to control the clearance.

2. A seal as claimed in claim 1 wherein the first and second components are relatively rotatable.

3. A seal as claimed in claim 2 wherein the first component is a static component and the second component is a rotatable component.

4. A seal as claimed in claim 3 wherein the first component comprises a stator structure, the second component comprises a rotor carrying a plurality of rotor blades, said at least one magnet being located on the stator structure, said at least one electrically conducting member being disposed on the rotor and said means to bias biasing said at least one magnet axially towards the rotor.

5. A seal as claimed in claim 4, wherein said at least one magnet is annular.

6. A seal as claimed in claim 2 wherein the first component is a rotatable component and the second component is a static component.

7. A seal as claimed in claim 6 wherein the first component is a rotor carrying a plurality of rotor blades, the second component is a stator casing, wherein said at least one magnet comprises a magnet on a said tip of each rotor blade, the stator casing having a portion surrounding the blade tips, the casing portion is biased radially towards the blade tips, the casing portion comprising said at least one electrically conducting member.

8. A seal as claimed in claim 3 wherein the at least one magnet comprises a plurality of magnetic members having radially inner ends, the static component carries said plurality of magnetic members disposed so as to extend radially and being tangentially inclined, the rotatable component includes said at least one electrically conducting member spaced radially from the radially inner ends of the magnetic members.

9. A seal as claimed in claim 8 wherein the radially inwardly extending and tangentially inclined magnetic members are bristles.

10. A seal as claimed in claim 1 wherein the means to bias comprises a supply of pressurised fluid.

11. A seal as claimed in claim 1 wherein the means to bias comprises spring means.

12. A seal as claimed in claim 1 wherein the at least one magnet on the first component is selected from the group comprising a permanent magnet, an electromagnet and a superconducting magnet.

13. A seal as claimed in claim 1 comprising means to measure the clearance and means to adjust the biasing means in response to the clearance measurement to control the clearance.

14. A seal as claimed in claim 1 wherein the clearance is defined between the at least one magnet on the first component and the electrically conducting member on the second component.

15. A seal as claimed in claim 1 wherein the clearance is defined between a sub component attached to the at least one magnet on the first component and a sub component attached to the electrically conducting member on the second component.

16. A seal as claimed in claim 4 wherein said rotor is annular.

17. A seal arrangement between relatively movable first and second components, the seal comprising a plurality of circumferentially arranged magnets on the first component and at least one electrically conducting member on the second component, a clearance being defined between the first component and the second component, means to bias the said magnets on the first component and the at least one electrically conducting member on the second component towards each other to reduce the clearance, and said magnets on the first component and the at least one electrically conducting member on the second component being arranged to produce a force to act against the biasing means to control the clearance, wherein the first component comprises a stator casing and a plurality of stator vanes extending radially inwardly from the stator casing, the second component comprises a rotor carrying a plurality of rotor blades, the stator vanes having radially inner ends, one of said magnets being located on the radially inner end of each said stator vane, said at least one electrically conducting member being disposed on the rotor and said means to bias urges the stator vanes radially inwardly towards the rotor.

18. A seal as claimed in claim 17 wherein the rotor is selected from the group comprising a compressor rotor and a turbine rotor.

19. A seal as claimed in claim 17 wherein said rotor is annular.

20. A seal arrangement between relatively rotatable first and second components, the first component comprises a stator structure, the second component comprises a rotor carrying a plurality of rotor blades, the seal comprising at least one magnet on the first component and at least one magnet on the second component, a clearance being defined between the first component and the second component, means to bias the at least one magnet on the first component and the at least one magnet on the second component towards each other to reduce the clearance, and the at least one magnet on the first component and the at least one magnet on the second component being arranged to produce a force to act against the biasing means to control the clearance.

21. A seal as claimed in claim 20 wherein said seal includes said at least one magnet on the stator structure and said at least one magnet on the rotor and wherein said means to bias biases the at least one magnet on the stator axially towards the rotor.

22. A seal as claimed in claim 21 wherein said rotor is annular.

23. A seal as claimed in claim 20 where the stator structure comprises a stator casing, each rotor blade having a tip at its radially outer end, each rotor blade having one of said magnets at its tip, the stator casing having a portion surrounding the rotor blade tips, the casing portion being biased radially towards the rotor blade tips, the casing portion comprising a plurality of said magnets of said first component.

24. A seal as claimed in claim 20 wherein the rotor is selected from the group comprising a compressor rotor and a turbine rotor.

25. A seal as claimed in claim 20 wherein the means to bias comprises a supply of pressurised fluid.

26. A seal as claimed in claim 20 wherein the means to bias comprises spring means.

27. A seal as claimed in claim 20 wherein the at least one magnet on the first component is selected from the group comprising a permanent magnet, an electromagnet and a superconducting magnet.

28. A seal as claimed in claim 20 wherein the at least one magnet on the second component is selected from the group comprising a permanent magnet, an electromagnet and a superconducting magnet.

29. A seal as claimed in claim 20 comprising means to measure the clearance and means to adjust the biasing means in response to the clearance measurement to control the clearance.

30. A seal as claimed in claim 20 wherein the clearance is defined between the at least one magnet on the first component and the at least one magnet on the second component.

31. A seal as claimed in claim 20 wherein the clearance is defined between a sub component attached to the at least one magnet on the first component and a sub component attached to the at least one magnet on the second component.

32. A seal arrangement between relatively rotatable first and second components, the first component being a static component and the second component is a rotatable component, the seal comprising at least one magnet on the first component and at least one magnet on the second component, a clearance being defined between the first component and the second component, means to bias the at least one magnet on the first component and the at least one magnet on the second component towards each other to reduce the clearance, the at least one magnet on the first component and the at least one magnet on the second component being arranged to produce a force to act directly against the biasing means to control the clearance, the static component carrying a plurality of flexible members extending towards the rotatable component, the plurality of flexible members comprising the magnets on the static component.

33. A seal arrangement as claimed in claim 32 wherein the flexible members are radially inwardly extending and tangentially inclined, the rotatable component has a seal at least one magnet spaced radially from the radially inner ends of the flexible members.

34. A seal arrangement as claimed in claim 32 wherein the flexible members are axially extending and circumferentially extending, the rotatable component has a said at least one magnet spaced axially from the axial ends of the flexible members.

35. A seal arrangement as claimed in claim 32 wherein the flexible members are bristles.

36. A seal arrangement between relatively rotatable first and second components, the first component comprising a stator structure including a plurality of stator vanes each having a radially inner end, the second component comprises a rotor carrying a plurality of rotor blades each having radially outer ends, the seal comprising a plurality of circumferentially arranged magnets each located on a said radially inner end of a said stator vane, and a plurality of circumferentially arranged magnets each located on the radially outer end of each said rotor blade, a clearance being defined between the first component and the second component, means to bias said magnets on the first component and said magnets on said second component towards each other to reduce the clearance, and said magnets on the first and second components being arranged to produce a force to act against the biasing means to control the clearance, wherein said means to bias urges the stator vanes radially inwardly towards the rotor.

37. A seal as claimed in claim 36, wherein said rotor is annular.

* * * * *